United States Patent
Adachi et al.

[11] Patent Number: 6,045,873
[45] Date of Patent: Apr. 4, 2000

[54] ONE-PACK EPOXY RESIN COMPOSITION, ONE-PACK CORROSION RESISTANT PAINT COMPOSITION, AND COATING METHOD USING SAID COMPOSITIONS

[75] Inventors: Yoshimitsu Adachi, Hiratsuka; Toshihiro Hamamura, Yokohama, both of Japan

[73] Assignee: Kansai Paint Company, Limited, Amagasaki, Japan

[21] Appl. No.: 09/029,096
[22] PCT Filed: May 17, 1996
[86] PCT No.: PCT/JP96/01313
§ 371 Date: Feb. 18, 1998
§ 102(e) Date: Feb. 18, 1998
[87] PCT Pub. No.: WO97/08219
PCT Pub. Date: Mar. 6, 1997

[30] Foreign Application Priority Data

Aug. 23, 1995 [JP] Japan ................................ 7-214281

[51] Int. Cl.$^7$ ....................................................... B05D 1/36
[52] U.S. Cl. ........................... 427/410; 525/522; 525/528; 525/530
[58] Field of Search ................................ 523/400, 442, 523/457, 458, 465; 525/522, 526, 528, 529, 530, 531; 528/103; 427/410

[56] References Cited

U.S. PATENT DOCUMENTS 5,357,008 10/1994 Tsai et al. ............................... 525/526

FOREIGN PATENT DOCUMENTS 09057192 3/1997 Japan .

Primary Examiner—Melvyn I. Marquis
Assistant Examiner—D. Aylward
Attorney, Agent, or Firm—Armstrong, Westerman Hattori, McLeland & Naughton

[57] ABSTRACT

The present invention provides:
(1) a one-packed epoxy resin composition comprising (A) an epoxy resin having two or more epoxy groups in its molecule and a number average molecular weight of 250 to 4,500, (B) a ketimine compound, (C) a dehydrating agent, and (D) at least one modified epoxy resin (d-1) selected among urethane-modified epoxy resins, amine-modified epoxy resins and dimer-modified epoxy resins and/or a resin (d-2) which has a softening point of 60° C. or above and is at least one member selected among xylene resins, ketone resins, coumarone resins and petroleum resins;

(2) a one-packed anticorrosive paint composition comprising the above one-packed epoxy resin composition and (E) a zinc dust in such an amount as to be present in a proportion of 20 to 95 wt. % in the heat-cured coating film; and (3) a coating method comprising the steps of undercoating the surface of a substrate and conducting topcoating, wherein the above one-packed epoxy resin composition or the above anticorrosive paint composition is used as the undercoating composition.

8 Claims, No Drawings

ONE-PACK EPOXY RESIN COMPOSITION, ONE-PACK CORROSION RESISTANT PAINT COMPOSITION, AND COATING METHOD USING SAID COMPOSITIONS

FIELD OF THE INVENTION

The present invention relates to a novel one-packed epoxy resin composition and a one-packed anticorrosive paint composition which have excellent storage stability and are capable of forming coatings excellent especially in adhesion and drying characteristics, and a coating method using the compositions.

BACKGROUND ART

Epoxy resins have been used in various fields such as coating compositions, sealing agents, adhesives and the like, because of their excellent properties, in particular, their high adhesion. However, most of conventionally used epoxy resin compositions are two-packed compositions consisting of a main agent and a curing agent. Since the curing reaction starts immediately after mixing the main agent and curing agent, the two-packed epoxy resin compositions have a very short pot life, resulting in poor workability.

Method were proposed for extending the pot life, for example by adding a latent curing agent such as blocked isocyanate to an epoxy resin. However, the latent curing agent is inherently of a heat-curing type, and is not practically usable for curing by ordinary temperature drying. The present applicant proposed in Japanese Examined Patent Publication No. 32231/1987 a method for preventing corrosion using a coating composition comprising an epoxy resin, a ketimine compound and a dehydrating agent. However, the composition, when used as a two-packed type, has poor drying characteristics and a very low curing rate, although having a prolonged pot life. On the other hand, when the composition is used as a one-packed type, it has insufficient storage stability.

DISCLOSURE OF THE INVENTION

An object of the present invention is to provide a one-packed epoxy resin composition and a one-packed anticorrosive paint composition which are free from the above drawbacks of the prior art, and a coating method using the compositions.

Another object of the present invention is to provide a one-packed epoxy resin composition and a one-packed anticorrosive paint composition which are excellent in storage stability, workability and the like and are capable of forming coatings excellent in drying characteristics, overcoatability, adhesion and the like, and a coating method using the compositions.

Other features of the invention will be apparent from the following description.

The present invention provides:
(1) a one-packed epoxy resin composition comprising
  (A) an epoxy resin having two or more epoxy groups in its molecule and a number average molecular weight of 250 to 4,500,
  (B) a ketimine compound,
  (C) a dehydrating agent, and
  (D) at least one modified epoxy resin (d-1) selected among urethane-modified epoxy resins, amine-modified epoxy resins and dimer acid-modified epoxy resins, and/or a resin (d-2) which has a softening point of 60° C. or above and is at least one member selected among xylene resins, ketone resins, coumarone resins and petroleum resins;

(2) a one-packed anticorrosive paint composition comprising the above one-packed epoxy resin composition and (E) a zinc dust in such an amount as to be present in a proportion of 20 to 95 wt. % in the heat-cured coating film; and (3) a coating method comprising the steps of undercoating the surface of a substrate and conducting topcoating, wherein the above one-packed epoxy resin composition or the above anticorrosive paint composition is used as the undercoating composition.

The present inventors carried out extensive research and found that the above objects can be achieved when the above specified modified epoxy resin and/or xylene resin or like resin are mixed with a composition containing an epoxy resin, a ketimine compound and a dehydrating agent. The present invention has been accomplished based on this novel finding.

The present invention will be described below in further detail.

The component (A) of the resin composition of the invention is an epoxy resin having two or more, preferably 2 to 5 epoxy groups in its molecule and a number average molecular weight of about 250 to 4,500, preferably about 350 to 3,000. A suitable epoxy equivalent of the epoxy resin is about 80 to 2,200, preferably 170 to 1,500.

Examples of the epoxy resin (A) include epoxy resins obtained by reacting a polyvalent alcohol, a polyvalent phenol or the like and excess epichlorohydrin or by reacting excess epichlorohydrin with an adduct of a polyvalent alcohol, a polyvalent phenol or the like with an alkylene oxide (such as ethylene oxide or propylene oxide). Examples of the polyvalent alcohol are ethylene glycol, polyethylene glycol, propylene glycol, neopentyl glycol, butylene glycol, hexanediol, glycerin, trimethylolethane, trimethylolpropane, pentaerythritol, diglycerol, sorbitol and the like. Examples of the polyvalent phenol include 2,2-bis(4-hydroxyphenyl)propane [bisphenol A], halogenated bisphenol A, 4,4-dihydroxydiphenylmethane [bisphenol F], tris(4-hydroxyphenyl)propane, resorcin, tetrahydroxyphenylethane, novolak-type polyvalent phenols, cresol-type polyvalent phenols and the like.

Other resins usable as the epoxy resin (A) include 1,2,3-tris(2,3-epoxypropoxy)propane, diglycidyl phthalate, glycidyl hexahydrophthalate, glycidyl tetrahydrophthalate, dimer acid glycidyl ester, tetraglycidyl aminodiphenylmethane, 3,4-epoxy-6-methylcyclohexylmethylcarboxylate, triglycidyl isocyanurate, 3,4-epoxycyclohexylmethylcarboxylate, polypropylene glycol glycidyl ether and the like.

The ketimine compound (B) used in the composition of the invention is a curing agent for the epoxy resin (A) and is a polyamine compound having at least one, preferably 1 to 6 primary amino groups blocked with a carbonyl compound. The "primary amino group blocked with a carbonyl compound" is a protected amino group which is readily hydrolyzed into a free primary amino group, for example in the presence of moisture, and is typically represented by the formula

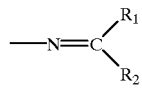

(1)

wherein $R_1$ is a hydrogen atom or a hydrocarbon group, and $R_2$ is a hydrocarbon group.

Examples of the hydrocarbon group include methyl, ethyl, propyl and like alkyl groups, cyclopropyl, cyclopentyl, cyclohexyl and like cycloalkyl groups, etc.

The polyamine compound may be aliphatic, alicyclic or aromatic. The polyamine compound needs to have a primary amino group which undergoes a curing reaction with the epoxy resin. Generally, it is advantageous for the polyamine compound to have a primary amino group equivalent of about 2,000 or less, preferably about 30 to 1,000. A suitable number average molecular weight of the polyamine compound is generally about 5,000 or less, preferably about 3,000 or less.

Examples of the polyamine compound include ethylenediamine, propylenediamine, butylenediamine, hexamethylenediamine, diethylenetriamine, triethylenetetramine, pentaethylenehexamine and like aliphatic polyamines; xylylenediamine, diaminodiphenylmethane, phenylenediamine and like aromatic polyamines; isophoronediamine, cyclohexylpropylamine and like alicyclic polyamines; and polyamides having at least one primary amino group at the end of the molecule; etc.

Among the above polyamine compounds, particularly preferred are those not containing a secondary amino group in its molecule, i.e., those having a ketimine of a primary amino group only, since such compounds have good storage stability when mixed with an epoxy resin to form a one-packed resin composition. Accordingly, when a ketimine compound having a secondary amino group in its molecule is used, the secondary amino group is preferably converted to a tertiary amino group by reacting with the above epoxy resin, a monoepoxy compound such as ethylene oxide or butyl glycidyl ether or the like.

Any of conventionally used ketones can be employed to obtain a ketimine of the polyamine compound. Examples of the ketones include acetone, methyl ethyl ketone, methyl isobutyl ketone, diisobutyl ketone, cyclohexanone and the like. The ketimine compound for use in the invention may be an aldimine obtained by reacting the polyamine compound with acetaldehyde, benzaldehyde or like aldehyde. The polyamine compound can be reacted with the ketone by a process known per se. The quantitative proportions and conditions for the reaction are preferably selected so that substantially all the primary amino groups in the polyamine compound react with the ketone. It is generally advantageous for easy progress of the reaction (dehydration) to use a ketone having low solubility in water and small steric hindrance, such as methyl isobutyl ketone, methyl ethyl ketone or the like.

The ketimine compound (B) is preferably used in such a proportion that the amount of active hydrogen in the ketimine compound is 0.5 to 5.0 equivalents, preferably 0.6 to 3.0 equivalent per equivalent of the epoxy group in the epoxy resin (A). If the amount of the active hydrogen is less than 0.5 equivalents, the curability of the resulting composition is insufficient. If the amount exceeds 5.0 equivalents, the cured film remains tacky and may have a problem in corrosion resistance. Accordingly, amounts outside the above range are not preferable.

The dehydrating agent (C) is used in the resin composition of the invention chiefly for preventing hydrolysis of the ketimine compound and reaction of the hydrolyzate with the epoxy resin. The dehydrating agent removes moisture from the composition by absorbing or reacting with water in advance.

Conventional dehydrating agents can be used as the dehydrating agent (C) without limitations. Typical examples include the following:

(1) Powdery and highly porous metal oxides or carbides such as synthetic silica, activated alumina, zeolite, activated carbon and the like.
(2) Calcium compounds having a formulation $CaSO_4$, $CaSO_4 \cdot \frac{1}{2}H_2O$, CaO or the like, for example, calcined gypsum, soluble gypsum, quick lime and the like.
(3) Metal alkoxides such as aluminum isopropylate, aluminum-sec-butylate, tetraisopropyl titanate, tetra-n-butyl titanate, zirconium-2-propylate, zirconium-n-butylate, ethyl silicate and the like.
(4) Silane coupling agents such as methyltrimethoxysilane, ethyltrimethoxysilane, vinyltrimethoxysilane and the like.
(5) Organic alkoxy compounds such as methyl orthoformate, ethyl orthoformate, dimethoxypropane and the like.
(6) Monofunctional isocyanates such as methyl isocyanate, ethyl isocyanate, propyl isocyanate, additive TI (trade name, tolylene monoisocyanate manufactured by Sumitomo-Bayer Urethane Co., Ltd.) and the like.

The above dehydrating agents can be used singly or as a mixture of two or more. The amount of the dehydrating agent (C) to be used varies according to the water content of the composition and the absorbing or adsorbing ability and reactivity of the dehydrating agent. Generally, it is suitable to use the dehydrating agent (C) in a proportion of about 0.1 to 25 wt. parts, preferably 0.2 to 15 wt. parts per 100 wt. parts of the total-solid content weight of the components (A), (B) and (D) of the composition. When the composition further contains a pigment, the proportion of the dehydrating agent may be increased in consideration of the water content of the pigment. If the dehydrating agent is used in a proportion less than 0.1 wt. parts, the resulting composition tends to have insufficient storage stability, whereas more than 25 wt. parts of dehydrating agent may adversely affect the film properties. Thus, proportions outside the above range are not preferable.

The resin composition of the invention essentially contains, as a component (D), at least one modified epoxy resin (d-1) selected among urethane-modified epoxy resins, amine-modified epoxy resins and dimer acid-modified epoxy resins and/or a resin (d-2) which has a softening point of 60° C. or above and is selected among xylene resins, ketone resins, coumarone resins and petroleum resins. The component (D) enables formation of a coating excellent in adhesion, drying characteristics and the like, and imparts excellent storage stability to the one-packed resin composition. In particular, the modified epoxy resin (d-1) is preferred since it improves adhesion of the coating to various materials (iron, nonferrous metals, nonmetals and the like).

The modified epoxy resin (d-1) has considerably lower reactivity with the polyamine compound than the epoxy resin (A). Since the reaction between the epoxy resin (A) and the polyamine compound proceeds at a very high rate, the modified epoxy resin (d-1) substantially does not participate in the curing reaction, although it has film formability. The composition containing the modified epoxy resin (d-1) but not containing the epoxy resin (A) has poor recoatability (repairability) and thus is not desirable.

Urethane-modified epoxy resins are preferred as the modified epoxy resin (d-1) since they impart a long-term storage stability to the composition. Examples of the urethane-modified epoxy resins include those prepared by reacting a polyisocyanate or monoisocyanate compound with an amine-added epoxy resin obtained by reacting an amine with an epoxy resin. The epoxy resin used for preparing the urethane-modified epoxy resin may be any of those exemplified as the epoxy resin (A). Examples of the amine include alkanolamines, aliphatic amines, aromatic amines, alicyclic amines and the like. Usable polyisocyanate compounds include known aliphatic, aromatic or alicyclic polyisocyanate compounds and the like. Usable monoisocyanate compounds include those obtained by reacting phosgene with an aliphatic or aromatic monoamine, those obtained by reacting a hydroxyl-containing compound with one isocyanate group of a diisocyanate compound.

Amine-modified epoxy resins preferably usable as the modified epoxy resin (d-1) are, for example, those obtained by addition-polymerizing an epoxy resin with a polyvalent phenol such as bisphenol A to obtain an epoxy resin having a desired molecular weight and then reacting the obtained resin with an alkanol amine (monoethanolamine, diethanolamine, triethanolamine or the like) for ring-opening the terminal epoxy group. The epoxy resin may be any of those exemplified as the epoxy resin (A).

Dimer acid-modified epoxy resins preferably usable as the modified epoxy resin (d-1) are, for example, epoxy resins having a desired molecular weight obtained by addition-polymerizing a polyvalent phenol such as bisphenol A and an adduct of an epoxy resin with a dimer acid (dimer of an unsaturated acid such as oleic acid, linoleic acid, talloil fatty acid or the like). The epoxy resin may be any of those exemplified as the epoxy resin (A).

The modified epoxy resin (d-1) has a number average molecular weight of about 2,000 to 65,000, preferably about 3,000 to 40,000, more preferably about 4,000 to 25,000. If the number average molecular weight is less than 2,000, the resulting coating film is reduced in adhesion and water resistance. On the other hand, the modified epoxy resin (d-1) which has a number average molecular weight exceeding 65,000 increases the viscosity of the composition and may adversely affects the workability and storage stability.

The modified epoxy resin (d-1), when employed, is suitably used in a proportion of 5 to 95 wt. parts, preferably 10 to 90 wt. parts per 100 wt. parts of the epoxy resin (A), in terms of resin solid content. If the proportion of the resin (d-1) is less than 5 wt. parts, the resulting composition has poor drying characteristics, whereas if the proportion exceeds 95 wt. parts, the resulting composition shows poor recoatability when repaired.

The resin (d-2) is at least one resin having a softening point of 60° C. or above and selected among xylene resins, ketone resins, coumarone resins and petroleum resins. The resin (d-2) preferably has a softening point of about 70 to 170° C.

Preferred xylene resins for use as the resin (d-2) are, for example, those obtained by reacting meta-xylene with formaldehyde using a catalyst such as sulfuric acid and further reacting the obtained xylene resin with a phenol such as phenol or ethylphenol or with rosin.

Preferred ketone resins for use as the resin (d-2) are, for example, those obtained by reacting a ketone such as cyclohexanone with a formaldehyde using a catalyst such as sulfuric acid.

Preferred coumarone resins for use as the resin (d-2) are, for example, those obtained by refining a 160 to 180° C. distillate fraction of naphtha (coumarone, indene, styrene or the like) and polymerizing the refined product by heating or with sulfuric acid or like catalyst.

Preferred petroleum resins for use as the resin (d-2) are, for example, those obtained by cationically polymerizing, with a Friedel-Crafts catalyst, $C_5$ or higher olefin residues from oil cracking.

The resin (d-2), when employed, is used in a proportion of 5 to 70 wt. parts, preferably 10 to 50 wt. parts per 100 wt. parts of the epoxy resin (A), in terms of resin solid content. If the proportion of the resin (d-2) is less than 5 wt. parts, the resulting composition has poor drying characteristics. If the proportion exceeds 70 wt. parts, the resulting composition shows poor recoatability when repaired and the film properties are adversely affected. Thus, proportions outside the above range are not desirable.

The resin composition of the invention is an organic solvent type composition containing the above components (A) to (D).

Any of known organic solvents may be used which include toluene, xylene and like aromatic hydrocarbons; acetone, methyl ethyl ketone, methyl isobutyl ketone, diisobutyl ketone and like ketones; ethyl acetate, n-butyl acetate, isobutyl acetate and like esters; ethyl alcohol, propyl alcohol, butyl alcohol and like alcohols; etc.

The resin composition of the invention may further contain any of various additives, such as coloring pigment, extender pigment, anticorrosive pigment or like pigment, thickening agent, plasticizer, filler, dispersant or the like.

The present invention also provides a one-packed anticorrosive paint composition which contains, in addition to the above components (A) to (D), a zinc dust (E) in such an amount as to be present in a proportion of 20 to 95 wt. % in the heat-cured coating film. The paint composition is suitable for coating a metallic surface, since it imparts high corrosion resistance to the surface. The zinc dust (E) can be used in combination with another metal powder such as aluminum powder.

Examples of the zinc dust (E) include metal zinc dusts and metal zinc alloy powders conventionally used in zinc-rich paints or zinc-rich primers. Among them, metal zinc dusts are preferred. It is suitable that the particles of the zinc dust are spherical and have a diameter of about 1 to 10 μm. The zinc dust is used usually in such an amount as to be present in the heat-cured coating film in a proportion of 20 to 95 wt. %, preferably 70 to 90 wt. %. The cured film containing less than 20 wt. % of the zinc dust does not have the contemplated corrosion resistance. If the zinc dust is used in such an amount as to be present in the cured film in a proportion exceeding 95%, the storage stability and film formability of the composition are adversely affected. Thus, proportions outside the above range are not desirable.

For inhibiting white rust (zinc oxide) which may be caused by outdoor exposure, an aluminum powder is suitably used in combination with the zinc dust. Preferred as the aluminum powder are aluminum flakes having a diameter of about 1 to 150 μm. The aluminum powder may be of a leafing type or non-leafing type. The aluminum powder, when employed, is added preferably in such an amount as to be present in the heat-cured coating film in a proportion of about 1 to 20 wt. %, preferably 5 to 15 wt. %.

The resin composition or anticorrosive paint composition of the invention can be used as a coating composition, a sealing agent or the like. The composition can be applied to the surface of a substrate made of metal (iron, aluminum, zinc or the like), wood, plastic, stone, slate, concrete, mortar or the like, or to a previously coated surface of these substrates. The composition can be applied by brush coating, spray coating, coating with any of various coaters or like common method.

The amount of the resin composition or anticorrosive paint composition to be applied is not limited. Generally, the composition is applied to a dry film thickness of about 5 to 80 μm, preferably about 10 to 50 μm, when used as a clear composition, or to a dry film thickness of about 10 to 150 μm, preferably about 25 to 120 μm, when used as a colored composition.

The present invention further provides a coating method comprising the steps of undercoating the surface of a substrate and conducting topcoating, wherein the above one-packed epoxy resin composition or one-packed anticorrosive paint composition is used as the undercoating composition.

The topcoating composition for use in the above coating method is not limited and may be any of conventional topcoating compositions. Specific examples are alkyd resin-based, chlorinated rubber-based, epoxy resin-based, silicon alkyd resin-based, urethane resin-based, silicon acrylic resin-based, fluorocarbon resin-based or like topcoating compositions.

When the one-packed epoxy resin composition of the invention is applied to a substrate, the ketimine compound (B) contained as a curing agent is gradually hydrolyzed with moisture in the air or the like and reproduces a primary amino group. The primary amino group reacts with the epoxy group in the epoxy resin (A), whereby the composition is cured and exhibits excellent corrosion resistance. In particular, the composition of the invention is improved in drying characteristics and adhesion, since it contains the component (D), i.e., a specific modified epoxy resin or like resin which substantially does not participate in the curing.

Accordingly, the epoxy resin composition of the invention comprising the components (A) to (D) is suitable particularly as an undercoating composition or a sealing agent, since it has good storage stability, is of a one-packed type which has good workability, and is excellent in adhesion, drying characteristics, repairability, overcoatability and the like. The anticorrosive paint composition of the invention, which further contains the zinc dust (E), can form a highly anticorrosive coating film and is particularly useful as an undercoating composition for steels.

BEST MODE OF CARRYING OUT THE INVENTION

The following examples illustrate the present invention in further detail, but by no means limit the scope of the invention. In the examples, part(s) and percentages are all by weight.

EXAMPLE 1

Into a 2-liter container were placed 100 parts of epoxy resin solution A (*1), 175 parts of urethane-modified epoxy resin solution (*2), 0.5 parts of vinyltrimethoxysilane as a dehydrating agent, 54 parts of xylene, 36 parts of methyl isobutyl ketone and 10 parts of ketimine compound A (*3). The mixture was stirred with a disperser to prepare a clear resin composition.

(*1) 70% toluene solution of "EPIKOTE 1001" (product of YUKA SHELL EPOXY Co., Ltd., solid epoxy resin having a number average molecular weight of about 900, two epoxy groups in its molecule and an epoxy equivalent of 450 to 500)

(*2) "ARAKYD 9203" (product of ARAKAWA CHEMICAL INDUSTRIES Co., Ltd., reaction product of amine-added epoxy resin with diisocyanate, having a number average molecular weight of 13,000)

(*3) "VERSAMINE K-13" (product of Henkel Hakusui Corp., ketimine of polyethylene polyamine having a secondary amino group adducted with an epoxy resin, having an amino group equivalent of 381 to 461)

EXAMPLES 2 TO 7 AND COMPARATIVE EXAMPLE 1 TO 5

Clear resin compositions were obtained by following the procedure of Example 1 and using the components shown in Table 1 in proportions (parts) shown therein.

(*4) "EPIKOTE 828" (product of YUKA SHELL EPOXY Co., Ltd., liquid epoxy resin having a number average molecular weight of about 380, two epoxy groups in its molecule and an epoxy equivalent of 184 to 194)

(*5) "Neopolymer 140" (product of NIPPON OIL Co., Ltd., petroleum resin having a solid content of 70%, a number average molecular weight of 1,300 and a softening point of 145° C., solvent: xylene)

(*6) Adduct of the epoxy resin (*1) with a reaction product of 2 moles of diethylene triamine and 4 moles of methyl isobutyl ketone, having a number average molecular weight of 1360, an amino group equivalent of 230 and a solid content of 70%, solvent: methyl isobutyl ketone/toluene 30/70)

TABLE 1

|  | Example | | | | | | | Comparative Example | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| Epoxy resin A (*1) | 100 | 100 | 100 | 10 |  | 100 | 100 | 100 |  |  | 100 | 100 |
| Epoxy resin B (*4) |  |  |  |  | 100 |  |  |  | 100 |  |  |  |
| Urethane-modified epoxy resin (*2) | 175 | 175 | 75 | 175 | 100 | 35 | 35 |  |  | 100 |  | 175 |
| Petroleum resin (*5) |  |  |  |  |  | 20 | 20 |  |  |  |  |  |
| Vinyltrimethoxy-silane | 0.5 | 0.8 | 0.5 | 0.5 | 0.5 | 0.5 | 0.8 |  |  |  | 1.0 |  |
| Xylene | 54 | 55 | 54 | 5 | 125 | 63 | 64 | 54 | 126 |  | 54 | 54 |
| Methyl isobutyl ketone | 36 | 37 | 36 | 3 | 85 | 42 | 43 | 36 | 84 |  | 36 | 36 |
| Ketimine compound A (*3) | 10 |  | 10 | 1 | 40 | 10 |  | 10 | 40 |  | 10 | 10 |
| Ketimine compound B (*6) |  | 24 |  |  |  |  | 24 |  |  |  |  |  |
| Solid content (%) | 40 | 40 | 40 | 40 | 40 | 40 | 40 | 40 | 40 | 40 | 40 | 40 |
| Active hydrogen/epoxy equivalent ratio | 0.8 | 0.8 | 0.8 | 0.8 | 0.8 | 0.8 | 0.8 | 0.8 | 0.8 |  | 0.8 | 0.8 |

The compositions of Examples 1 to 7 and Comparative Examples 1 to 5 were tested for drying characteristics, storage stability and adhesion. The test methods are as follows.

Drying characteristics: Each test composition was applied to two tin plates (0.8×70×150 mm) using a film applicator with a clearance of 100 μm to prepare two test plates. The obtained test plates were allowed to stand at 65% RH and 5° C. or 20° C. to measure the period necessary for the coating surface to become tack dry to touch.

The results were rated as follows: A; within 8 hours, B; within 16 hours, C; within 24 hours, D; within 48 hours, E; over 48 hours.

Storage stability: 800 g of the test composition was weight out, sealed up in a 1-liter cylindrical can and allowed to stand at 40° C. for one month. Then, the condition of the test composition was observed and rated as follows.

A; no abnormalities, B; thickened or precipitated, C; gelled Adhesion: Substrates used were a cold rolled steel plate (JIS G-3141), a galvanized steel plate (JIS G-3141 SPCC-SD) and an aluminum plate (JIS H-4000 5052P), each measuring 0.8×70×150 mm, and a mortar plate (JIS R-5201) measuring 10×100×200 mm. The test composition was applied to the substrates using a film applicator with a clearance of 100 μm and dried at 20° C. and 65% RH for 7 days to prepare test plates. The test plates were allowed to stand in a humidity resistance tester (at 50° C. and at least 95% RH) for 240 hours. Immediately after being taken out from the tester, the test plates were tested for adhesion by the X-cut tape test method prescribed in JIS K-5400-8.5.3.

The condition of the coating surface was rated as follows: A; no abnormalities, B; partially peeled off, C; peelings on the entire surface.

The test results are shown in Table 2.

TABLE 2

|  | Example | | | | | | | Comparative Example | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| Drying characteristics | | | | | | | | | | | | |
| 5° C. | B | B | B | B | D | B | B | D | E | A | E | B |
| 20° C. | A | A | B | A | C | B | B | C | D | A | D | A |
| Storage stability | A | A | A | A | A | A | A | C | C | A | B | B |

TABLE 2-continued

|  | Example | | | | | | | Comparative Example | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| Adhesion | | | | | | | | | | | | |
| Cold rolled steel plate | A | A | A | A | A | A | A | A | B | A | A | B |
| Galvanized steel plate | A | A | A | A | A | A | A | C | C | A | C | A |
| Aluminum plate | A | A | A | A | A | A | A | B | B | A | B | A |
| Mortar plate | A | A | A | B | A | A | A | A | A | B | A | A |

EXAMPLE 8

Into a 2-liter container were placed 100 parts of epoxy resin solution A (*1), 175 parts of urethane-modified epoxy resin solution (*2), 30 parts of vinyltrimethoxysilane, 375 parts of magnesium silicate, 110 parts of titanium dioxide, 106 parts of xylene and 71 parts of methyl isobutyl ketone. The mixture was stirred with a disperser and dispersed in a sand mill [JIS K-5400, fineness of dispersion, distribution chart method (graining: less than 60 μm)]. Thereafter, 10 parts of ketimine compound A (*3) was added, and the resulting mixture was stirred with a disperser to obtain a colored resin composition.

EXAMPLES 9 TO 13 AND COMPARATIVE EXAMPLES 6 TO 9

Colored resin compositions were prepared by following the procedure of Example 8 and using the components shown in Table 3 in proportions (parts) shown therein.

TABLE 3

|  | Example | | | | | | Comparative Example | | | |
| --- | --- | --- | --- | --- | --- | --- | --- | --- | --- | --- |
|  | 8 | 9 | 10 | 11 | 12 | 13 | 6 | 7 | 8 | 9 |
| Epoxy resin A (*1) | 100 | 100 | 10 | 100 | 100 | 100 | 100 |  | 100 | 100 |
| Urethane-modified epoxy resin (*2) | 175 | 175 | 160 | 12 |  |  |  | 100 |  | 175 |
| Petroleum resin (*5) |  |  |  |  | 20 | 20 |  |  |  |  |
| Vinyltrimethoxysilane | 30 | 30 | 30 | 30 | 30 | 30 |  |  | 30 |  |
| Magnesium silicate | 375 | 375 | 100 | 100 | 170 | 170 | 200 | 114 | 200 | 375 |
| Titanium dioxide | 110 | 110 | 32 | 32 | 51 | 51 | 60 | 34 | 60 | 110 |
| Xylene | 106 | 106 | 45 | 29 | 75 | 75 | 90 | 25 | 90 | 106 |
| Methyl isobutyl ketone | 71 | 71 | 30 | 20 | 50 | 50 | 60 | 15 | 60 | 71 |
| Ketimine compound A (*3) | 10 |  | 1 | 10 | 10 |  | 10 |  | 10 | 10 |
| Ketimine compound B (*6) |  | 24 |  |  |  | 24 |  |  |  |  |
| Solid content (%) | 65 | 65 | 50 | 65 | 65 | 62 | 65 | 65 | 65 | 65 |
| Active hydrogen/epoxy equivalent ratio | 0.8 | 0.8 | 0.8 | 0.8 | 0.8 | 0.8 | 0.8 |  | 0.8 | 0.8 |

The compositions of Examples 8 to 13 and Comparative Examples 6 to 9 were tested for drying characteristics, storage stability, adhesion and corrosion resistance. The drying characteristics, storage stability and adhesion were tested by the above methods. The corrosion resistance was tested by the following method.

Corrosion resistance: Each test composition was applied to a polished steel plate measuring 0.8×70×150 mm using a film applicator with a clearance of 100 μm. The coating was dried at 20° C. and 65% RH for 7 days to obtain a test plate. X-cut flaws were made on the coating surface of the test plate with a knife. The resulting test plate was subjected to a 240-hour salt spray test at 35° C. and then checked for rust and blister.

The condition of the coating surface was rated as follows: A; no abnormalities, B; partially rustered or blistered, C; entirely rusted or blistered.

The results are shown in Table 4.

TABLE 4

|  | Example | | | | | | Comparative Example | | | |
| --- | --- | --- | --- | --- | --- | --- | --- | --- | --- | --- |
|  | 8 | 9 | 10 | 11 | 12 | 13 | 6 | 7 | 8 | 9 |
| Drying characteristics | | | | | | | | | | |
| 5° C. | B | B | B | B | B | B | D | A | E | B |
| 20° C. | A | A | A | B | A | A | A | A | B | A |
| Storage stability | A | A | A | B | A | A | C | A | B | B |
| Adhesion | | | | | | | | | | |
| Cold rolled steel plate | A | A | A | A | A | A | A | A | A | A |
| Galvanized steel plate | A | A | A | A | A | A | C | A | C | A |
| Aluminum plate | A | A | A | A | A | A | B | A | B | A |
| Mortar plate | A | A | A | A | A | A | A | B | A | A |
| Corrosion resistance | A | A | A | A | A | A | A | A | A | A |

EXAMPLES 14 TO 17

A mortar plate measuring 10×100×200 mm was brush-coated with the composition of Example 1 as an undercoating composition to a dry film thickness of about 30 μm. The coating was dried at 20° C. and 65% RH for 24 hours. Each of the topcoating compositions shown in Table 5 was applied to the undercoat and dried at 20° C. and 65% RH for 7 days to obtain a test plate.

EXAMPLES 18 TO 21 AND COMPARATIVE EXAMPLES 10 TO 13

Test plates were prepared by following the procedure of Example 14 and using the undercoating compositions and topcoating compositions shown in Table 5.

The test plates obtained in Examples 14 to 21 and Comparative Examples 10 to 13 were tested for overcoatability and recoatability (repairability) by the following methods.

Overcoatability: An adhesion test was carried out by the X-cut tape test method prescribed in JIS K-5400 8.5.3.

The results were rated as follows: A; no abnormalities, B; peelings on part of the topcoating surface, C; peelings on the entire topcoating surface.

Recoatability: Test plates were prepared by following the procedures of the above Examples and Comparative Examples with the exception that the drying period after applying the topcoating composition was changed to 24 hours. X-cut flaws reaching the substrate were made on the test plate, and the resulting surface was recoated with each of the undercoating compositions. Then, the condition of the coating surface was observed and rated as follows: A; no abnormalities, B; partially shrinked, C; shrinkage on the entire surface.

The results are shown in Table 5.

TABLE 5

|  | Example | | | | | |
| --- | --- | --- | --- | --- | --- | --- |
|  | 14 | 15 | 16 | 17 | 18 | 19 |
| Undercoating composition | Ex.1 | Ex.1 | Ex.1 | Ex.1 | Ex.6 | Ex.6 |
| Topcoating composition | I | II | III | IV | I | II |
| Overcoatability | A | A | A | A | A | A |
| Recoatability | A | A | A | A | A | A |

TABLE 5-continued

|  | Example | | Comparative Example | | | |
| --- | --- | --- | --- | --- | --- | --- |
|  | 20 | 21 | 10 | 11 | 12 | 13 |
| Undercoating composition | Ex.6 | Ex.6 | Comp. Ex.3 | Comp. Ex.3 | Comp. Ex.3 | Comp. Ex.3 |
| Topcoating composition | III | IV | I | II | III | IV |
| Overcoatability | A | A | A | A | A | A |
| Recoatability | A | A | C | A | C | C |

In Table 5, the topcoating compositions I, II, III and IV are as follows.

Topcoating composition I: Chlorinated rubber-based organic solvent type coating composition "CLEAN RABATECT", product of KANSAI PAINT Co., Ltd.

Topcoating composition II: Epoxy resin-based organic solvent type coating composition "ESCO", product of KANSAI PAINT Co., Ltd.

Topcoating composition III: Polyurethane resin-based organic solvent type coating composition "RETAN 6000", product of KANSAI PAINT Co., Ltd.

Topcoating composition IV: Fluorocarbon resin-based organic solvent type coating composition "KANPE FRON HD", product of KANSAI PAINT Co., Ltd.

EXAMPLES 22 TO 26

A steel plate measuring 0.8×175×150 mm was brush-coated with the composition of Example 8 to a dry film thickness of about 50 μm, and the coating was dried at 20° C. and 65% RH for 24 hours. The coating was further brush-coated with each of the topcoating compositions shown in Table 6 to a dry film thickness of about 30 μm, and the coating was dried at 20° C. and 65% RH for 7 days, giving a test plate.

COMPARATIVE EXAMPLES 14 TO 18

Test plates were obtained by following the procedure of Example 22 and using the undercoating compositions and topcoating compositions shown in Table 6.

The test plates of Examples 22 to 26 and Comparative Examples 14 to 18 were tested for overcoatability and recoatability (repairability) by the above methods.

The results are shown in Table 6.

TABLE 6

|  | Example | | | | |
| --- | --- | --- | --- | --- | --- |
|  | 22 | 23 | 24 | 25 | 26 |
| Undercoating composition | Ex.8 | Ex.8 | Ex.8 | Ex.8 | Ex.8 |
| Topcoating composition | I | II | III | IV | V |
| Overcoatability | A | A | A | A | A |
| Recoatability | A | A | A | A | A |

TABLE 6-continued

|  | Comparative Example | | | | |
|---|---|---|---|---|---|
|  | 14 | 15 | 16 | 17 | 18 |
| Undercoating composition | Comp. Ex.7 | Comp. Ex.7 | Comp. Ex.7 | Comp. Ex.7 | Comp. Ex.7 |
| Topcoating composition | I | II | III | IV | V |
| Overcoatability | A | A | A | A | A |
| Recoatability | C | A | C | C | C |

In Table 6, the topcoating compositions I, II, III and IV are as indicated above, and the topcoating composition V is as follows.

Topcoating composition V: Alkyd resin-based organic solvent type coating composition "SD MARINE H", product of KANSAI PAINT Co., Ltd.

EXAMPLES 27 TO 34 AND COMPARATIVE EXAMPLES 19 TO 21

Anticorrosive paint compositions (zinc-rich paints) were prepared by following the procedure of Example 8 and using the components shown in Table 7 in proportions shown therein. In Table 7, (*7) to (*9) indicate the following.

(*7) "ALMIPASTE #50-635" (60% mineral spirit paste of aluminum powder, product of TOYO ALUMINIUM K.K.)

(*8) "TALEN 7200-20" (anti-sagging agent, product of KYOEISHA CHEMICAL Co., Ltd.)

(*9) "TOHMIDE 225E", (comparative curing agent, product of FUJI KASEI Co., Ltd.)

TABLE 7

|  | Example | | | | | | | | Comp. Ex. | | |
|---|---|---|---|---|---|---|---|---|---|---|---|
|  | 27 | 28 | 29 | 30 | 31 | 32 | 33 | 34 | 19 | 20 | 21 |
| Epoxy resin A (*1) | 100 | 100 | 100 | 100 | 100 | 100 | 100 | 100 | 100 | 100 | 100 |
| Urethane-modified epoxy resin (*2) | 75 | 75 | 75 | 75 | 75 | 75 | 75 | 75 | 75 | 75 |  |
| Vinyl trimethoxysilane | 30 | 30 | 30 | 30 | 30 | 30 | 30 | 30 | 30 | 30 |  |
| Magnesium silicate | 46 | 46 | 46 | 46 | 46 | 46 | 240 | 46 | 500 | 29 | 35 |
| Zinc dust | 846 | 846 | 496 | 766 | 766 | 1330 | 652 | 596 | 114 | 3523 | 645 |
| Aluminum paste (*7) |  |  |  | 123 | 123 | 148 |  | 385 |  |  |  |
| Fatty acid amide wax (*8) | 5 | 5 | 5 | 5 | 5 | 5 | 5 | 5 | 5 | 5 | 5 |
| Xylene | 41 | 41 | 5 | 15 | 15 | 76 | 41 | 16 | 229 | 1845 | 59 |
| Methyl isobutyl ketone | 27 | 27 | 3 | 10 | 10 | 50 | 27 | 10 | 115 | 922 | 39 |
| Ketimine compound A (*3) | 10 |  | 10 | 10 |  | 10 | 10 | 10 | 10 | 10 |  |
| Ketimine compound B (*6) |  | 24 |  |  | 24 |  |  |  |  |  |  |
| Polyamide (*9) |  |  |  |  |  |  |  |  |  |  | 14 |
| Solid content (%) | 85 | 85 | 85 | 85 | 84 | 85 | 85 | 76 | 62 | 56 | 85 |
| Active hydrogen/epoxy equivalent | 0.8 | 0.8 | 0.8 | 0.8 | 0.8 | 0.8 | 0.8 | 0.8 | 0.8 | 0.8 | 0.8 |
| Content in heat-cured coating film |  |  |  |  |  |  |  |  |  |  |  |
| Zn content (%) | 84 | 84 | 76 | 76 | 76 | 84 | 65 | 60 | 16 | 96 | 84 |
| Al content (%) |  |  |  | 8 | 7 | 6 |  | 25 |  |  |  |

The paint compositions of Examples 27 to 34 and Comparative Examples 19 to 21 were tested for storage stability, corrosion resistance and overcoatability. The storage stability was tested by the above method, and the corrosion resistance and overcoatability were tested as follows.

Corrosion resistance: The test composition was diluted with 15% (outer percentage) of xylene and air-sprayed to a steel plate to a dry film thickness of 50 μm. The coating was dried at 20° C. and 65% RH for 7 days to obtain a test plate. The steel plate used had been sandblasted (near-white metal blast cleaning according to ISO Sa2.5) or treated with a power tool (power tool cleaning according to ISO St3). X-cut flaws were made on the coating surface of the test plate with a knife. Then, the test plate was subjected to a 2,000-hour salt spray test at 35° C. and checked for rust.

The condition of the coating surface was rated as follows: A; no abnormalities, B; red rust on part of the surface, C; rust on the entire surface. The test plate was checked also for white rust (zinc oxide). Overcoatability: The test composition was diluted with 15% (outer percentage) of xylene, and air-sprayed to the sandblasted steel plate to a dry film thickness of 50 μm. The coating was dried at 20° C. and 65% RH, and brush-coated with "EPOMARINE" as a topcoating composition (product of KANSAI PAINT Co., Ltd., an epoxy resin-based organic solvent type coating composition) to a dry film thickness of about 30 μm. The resulting plate was dried at 20° C. and 65% RH for 7 days to obtain a test plate. The test plate was tested for overcoatability by the above method.

The results are shown in Table 8.

TABLE 8

|  | Example | | | | |
|---|---|---|---|---|---|
|  | 27 | 28 | 29 | 30 | 31 |
| Storage stability | A | A | A | A | A |
| Corrosion resistance |  |  |  |  |  |
| Sandblasted steel plate | A | A | A | A | A |
| Occurence of white rust (zinc oxide) | Yes | Yes | Yes | No | No |
| Power tool-treated Steel plate | A | A | A | A | A |

TABLE 8-continued

| Occurence of white rust (Zinc oxide) | Yes | Yes | Yes | No | NO |
|---|---|---|---|---|---|
| Overcoatability | A | A | A | A | A |

TABLE 8-continued

|  | Example | | | Comp.Ex. | | |
| --- | --- | --- | --- | --- | --- | --- |
|  | 32 | 33 | 34 | 19 | 20 | 21 |
| Storage stability | A | A | A | A | B | C |
| Corrosion resistance | | | | | | |
| sandblasted steel plate | A | A | A | C | A | A |
| Occurence of white rust (zinc oxide) | No | Yes | No | Yes | Yes | Yes |
| Power tool-treated steel plate | A | B | B | C | B | A |
| Occurence of white rust (zinc oxide) | No | Yes | No | Yes | Yes | Yes |
| Overcoatability | A | A | A | A | A | A |

We claim:

1. A one-packed epoxy resin composition comprising:

(A) an epoxy resin having two or more epoxy groups in the resin molecule and said epoxy resin having a number average molecular weight of 250 to 4,500, (B) a ketimine compound, (C) a dehydrating agent, and (D) at least one epoxy resin (d-1) selected among urethane-modified epoxy resins prepared by reacting a polyisocyanate or monoisocyanate compound with an amine-added epoxy resin; amine-modified epoxy resins obtained by addition-polymerizing an epoxy resin with a polyvalent phenol such as bisphenol A to obtain an epoxy resin having a desired molecular weight and then reacting the obtained resin with an alkanol amine; and dimer acid-modified epoxy resins obtained by addition-polymerizing a polyvalent phenol such as bisphenol A and an adduct of an epoxy resin with a dimer acid; and/or a resin (d-2) which has a softening point of 60° C. or above and is at least one member selected among xylene resins obtained by reacting meta-xylene with formaldehyde using a catalyst such as sulfuric acid and further reacting the obtained xylene resin with a phenol or a rosin; ketone resins obtained by reacting a ketone such as cyclohexanone with a formaldehyde using a catalyst such as sulfuric acid; coumarone resins obtained by refining a 160 to 180° C. distillate fraction of naphtha and polymerizing the refined product by heating or with sulfuric acid; and petroleum resins obtained by cationically polymerizing, with a Friedel-Crafts catalyst, $C_5$ or higher olefin residues from oil cracking.

2. A composition according to claim 1 which contains the ketimine compound (B) in such a proportion that the amount of the active hydrogen in the ketimine compound is 0.5 to 5.0 equivalents per equivalent of the epoxy group in the epoxy resin (A).

3. A composition according to claim 1 which contains the dehydrating agent (C) in a proportion of 0.1 to 25 wt. parts per 100 wt. parts of the total solid content weight of the components (A), (B) and (D) of the composition.

4. A composition according to claim 1 which contains the resin (d-1) as the component (D) in a proportion of 5 to 95 wt. parts per 100 wt. parts of the epoxy resin (A), in terms of resin solid content.

5. A composition according to claim 1 which contains the resin (d-2) as the component (D) in a proportion of 5 to 70 wt. parts per 100 wt. parts of the epoxy resin (A), in terms of resin solid content.

6. A one-packed anticorrosive paint composition comprising:

(A) an epoxy resin having two or more epoxy groups in the resin molecule and said epoxy resin having a number average molecular weight of 250 to 4,500, (B) a ketimine compound, (C) a dehydrating agent, and (D) at least one epoxy resin (d-1) selected among urethane-modified epoxy resins prepared by reacting a polyisocyanate or monoisocyanate compound with an amine-added epoxy resin; amine-modified epoxy resins obtained by addition-polymerizing an epoxy resin with a polyvalent phenol such as bisphenol A to obtain an epooxy resin having a desired molecular weight and then reacting the obtained resin with an alkanol amine: and dimer acid-modified epoxy resins obtained by addition-polymerizing a polyvalent phenol such as bisphenol A and an adduct of an epoxy resin with a dimer acid; and/or a resin (d-2) which has a softening point of 60° C. or above and is at least one member selected among xylene resins obtained by reacting meta-xylene with formaldehyde using a catalyst such as sulfuric acid and further reacting the obtained xylene resin with a phenol or a rosin; ketone resins obtained by reacting a ketone such as cyclohexanone with a formaldehyde using a catalyst such as sulfuric acid; coumarone resins obtained by refining a 160 to 180° C. distillate fraction of naphtha and polymerizing the refined product by heating or with sulfuric acid; and petroleum resins obtained by cationically polmerizing, with a Friedel-Crafts catalyst $C_5$ or higher olefin residues from oil cracking, and (E) a zinc dust in such an amount as to be present in a proportion of 20 to 95 wt. % in the heat-cured coating film.

7. A coating method comprising the steps of:

undercoating the surface of a substrate with the one-packed epoxy resin composition according to claim 1; and applying a topcoating composition.

8. A coating method comprising the steps of:

undercoating the surface of a substrate with the one-packed anticorrosive paint composition according to claim 6; and applying a topcoating composition.

* * * * *